US009146628B2

(12) United States Patent
Wakizaka et al.

(10) Patent No.: US 9,146,628 B2
(45) Date of Patent: Sep. 29, 2015

(54) INPUT APPARATUS AND STORAGE MEDIUM STORING INPUT CONTROL PROGRAM

(75) Inventors: Masaaki Wakizaka, Ichinomiya (JP); Hiroki Asai, Kiyosu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 328 days.

(21) Appl. No.: 13/014,465

(22) Filed: Jan. 26, 2011

(65) Prior Publication Data

US 2011/0187661 A1    Aug. 4, 2011

(30) Foreign Application Priority Data

Jan. 29, 2010  (JP) .................................. 2010-019607
Jun. 23, 2010  (JP) .................................. 2010-142998

(51) Int. Cl.
*G06F 3/041*    (2006.01)
*G06F 3/045*    (2006.01)

(52) U.S. Cl.
CPC ...................................... *G06F 3/041* (2013.01)

(58) Field of Classification Search
USPC .......... 345/173–179; 715/702, 788, 808, 821, 715/835
See application file for complete search history.

(56) References Cited

U.S. PATENT DOCUMENTS

| 6,445,412 | B1 | 9/2002 | Shiohara |
| 2001/0004424 | A1 | 6/2001 | Mutoh et al. |
| 2001/0006382 | A1 | 7/2001 | Sevat |
| 2006/0101344 | A1 | 5/2006 | Tabata |
| 2006/0107235 | A1 | 5/2006 | Esaki et al. |
| 2006/0274362 | A1* | 12/2006 | Kita .............................. 358/1.15 |

(Continued)

FOREIGN PATENT DOCUMENTS

| CN | 101473295 A | 7/2009 |
| CN | 101622591 A | 1/2010 |

(Continued)

OTHER PUBLICATIONS

The State Intellectual Property Office of the People's Republic of China, Notification of First Office Action for Chinese Patent Application No. 201110030804.2 (counterpart Chinese patent application), issued Jul. 20, 2012.

(Continued)

*Primary Examiner* — Alexander Eisen
*Assistant Examiner* — Nan-Ying Yang
(74) *Attorney, Agent, or Firm* — Baker Botts L.L.P.

(57) ABSTRACT

An input apparatus including: a display device which displays an operational image; an image-designation detecting device which detects designation of the operational image; a processing executing section configured to, where the image-designation detecting device has detected that the operational image has been designated, execute a processing assigned to the designated operational image; a display updating section which updates display on the display device from a state in which the operational image has been displayed; and a disabling section configured to, where the image-designation detecting device has detected a designation of an operational image which has been displayed on the display device after the update of the display by the display updating section and which is different from an operational image having been displayed on the display device before the update, disable an execution of a processing assigned to the designated operational image.

13 Claims, 8 Drawing Sheets

(56) References Cited

U.S. PATENT DOCUMENTS

| | | |
|---|---|---|
| 2009/0160802 A1 | 6/2009 | Yasumi |
| 2009/0193357 A1* | 7/2009 | Panico et al. ............... 715/803 |
| 2009/0265630 A1 | 10/2009 | Morikawa et al. |
| 2010/0182244 A1 | 7/2010 | Onda et al. |
| 2011/0029185 A1 | 2/2011 | Aoki et al. |

FOREIGN PATENT DOCUMENTS

| | | |
|---|---|---|
| JP | H11-126135 A | 5/1999 |
| JP | H11-345242 A | 12/1999 |
| JP | 2001-169039 A | 6/2001 |
| JP | 2002-207546 A | 7/2002 |
| JP | 2002-369123 A | 12/2002 |
| JP | 2003-518831 T | 6/2003 |
| JP | 2004-094394 A | 3/2004 |
| JP | 2005-049546 A | 2/2005 |
| JP | 2006-135780 A | 5/2006 |
| JP | 2006-146516 A | 6/2006 |
| JP | 2006-340259 A | 12/2006 |
| JP | 2007-166366 A | 6/2007 |
| JP | 2008-310521 A | 12/2008 |
| JP | 2008-310522 A | 12/2008 |
| JP | 2009-037343 A | 2/2009 |
| JP | 2009-037344 A | 2/2009 |
| JP | 2009-153072 A | 7/2009 |
| JP | 2010-057840 A | 3/2010 |
| WO | 2009/116285 A1 | 9/2009 |

OTHER PUBLICATIONS

Japan Patent Office, Notification of Reason for Refusal for Patent Application No. JP 2010-142998 (counterpart Japanese patent application), mailed Oct. 15, 2013.

* cited by examiner

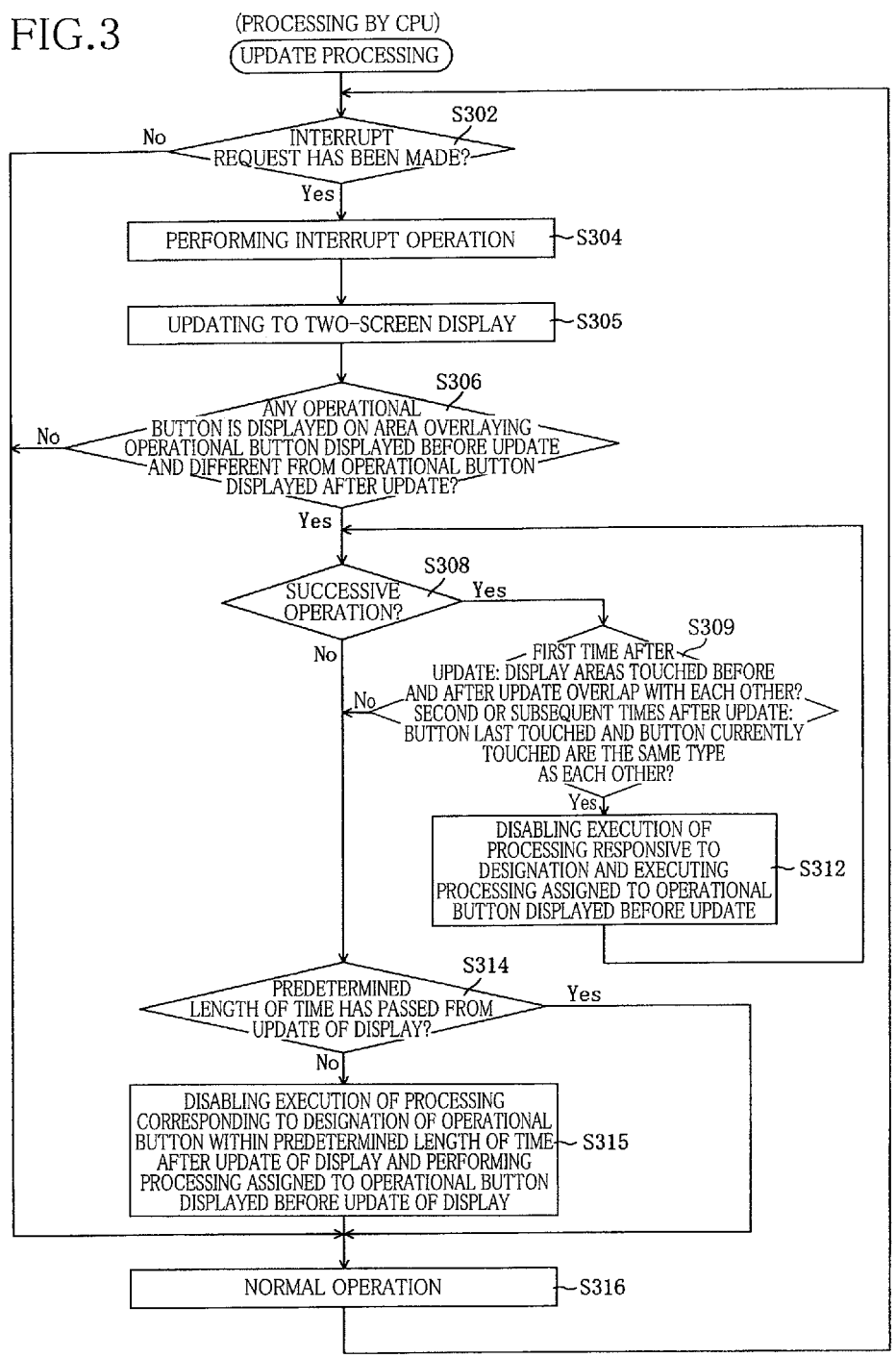

INPUT APPARATUS AND STORAGE MEDIUM STORING INPUT CONTROL PROGRAM

CROSS REFERENCE TO RELATED APPLICATION

The present application claims priority from Japanese Patent Application Nos. 2010-019607 filed on Jan. 29, 2010, and 2010-142998 filed on Jun. 23, 2010, the disclosure of which is herein incorporated by reference in its entirety.

BACKGROUND OF THE INVENTION

1. Field of the Invention

The present invention relates to an input apparatus and a storage medium storing an input control program.

2. Description of the Related Art

There is known various apparatuses to which instructions can be inputted by a user touching or pressing a button displayed on a display device. For example, there is a multi-function apparatus which has a plurality of functions such as a copying function and a telephone function and to which instructions can be inputted by a user touching or pressing a button or an image displayed on a display device. In this apparatus, where a job of a certain function has interrupted in a state in which a screen for a function different from the certain function is displayed, the apparatus splits the screen into two screens such that a button originally displayed is displayed on one of the two screens, and a button related to the job of the interrupted function is displayed on the other screen.

SUMMARY OF THE INVENTION

However, in a configuration of the above-described multi-function apparatus, where the screen is suddenly split because a certain event occurs immediately before a user touches or presses the button on the screen, the user may touch the screen without noticing the change of the screen or by excessive motion. Where a button different from the button the user has intended to touch has been displayed on a position touched by the user, a processing unintended by the user may be unfortunately executed. For example, where the user has suddenly received an incoming call from an external device just before touching the button displayed on the screen, then a "phone disconnecting button" has been suddenly displayed on the position the user is going to touch on the screen, and finally the user has unintentionally touched the "phone disconnecting button", the phone line is disconnected against a user's intention.

It is noted that such a problem may occur in various apparatuses or devices other than the multi-function apparatus. For example, also in a case where a pop-up advertisement has been suddenly displayed during the user browsing a web page using a personal computer or in a case where a dialog box has been suddenly displayed during an operation of the user with the personal computer, the user may inadvertently touch or designate the pop-up advertisement or the dialog box suddenly displayed.

This invention has been developed in view of the above-described situations, and it is an object of the present invention to provide an input apparatus and a storage medium storing an input control program which can prevent an execution of a processing unintended by a user even where the user has inadvertently designated an operational image after an update of a display.

The object indicated above may be achieved according to the present invention which provides an input apparatus comprising: a display device configured to display at least one operational image which accepts an input of an input object; an image-designation detecting device configured to detect a designation of the at least one operational image displayed on the display device; a processing executing section configured to, where the image-designation detecting device has detected that the at least one operational image has been designated, execute a processing assigned in advance to the designated operational image; a display updating section configured to perform an update of an operational screen on the display device from a state in which the at least one operational image has been displayed on the display device, the operational screen including the at least one operational image; and a disabling section configured to, where the image-designation detecting device has detected a designation of an operational image which has been displayed on the display device after the update of the operational screen by the display updating section and which is different from an operational image having been displayed on the display device before the update, disable an execution of a processing assigned to the designated operational image.

The object indicated above may also be achieved according to the present invention which provides a storage medium storing an input control program executed by an inputting apparatus, the input control program comprising: displaying at least one operational image; detecting a designation of the displayed at least one operational image; and when a processing assigned in advance to the designated operational image is executed where the designation of the at least one operational image has been detected where the designation of the operational image different from an operational image having been displayed before an update of a display has been detected after an operational screen has been updated from a state in which the at least one operational image has been displayed, disabling the execution of the processing assigned in advance to the designated operational image.

BRIEF DESCRIPTION OF THE DRAWINGS

The objects, features, advantages, and technical and industrial significance of the present invention will be better understood by reading the following detailed description of embodiments of the invention, when considered in connection with the accompanying drawings, in which:

FIG. 3 is a flow-chart showing an update processing executed by a CPU of the MFP as the first embodiment;

DESCRIPTION OF THE EMBODIMENTS

Hereinafter, there will be described embodiments of the present invention by reference to the drawings.

Figure 1:
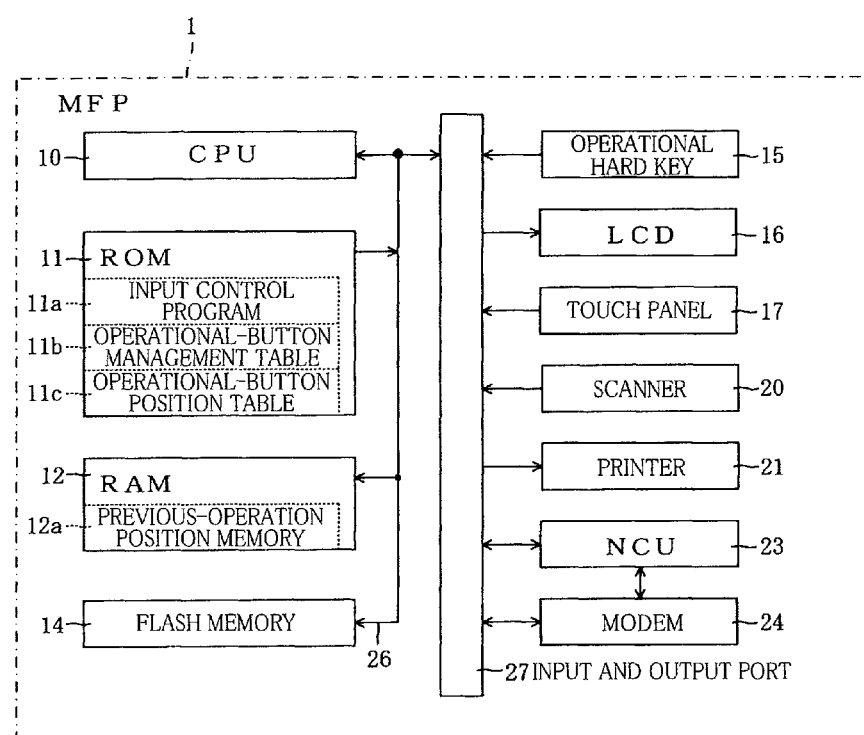
FIG. 1 is a block diagram showing an electric construction of an MFP as an embodiment of the present invention.

As shown in FIG. 1, a Multi Function Peripheral (MFP) 1 has various functions such as a copying function, a facsimile function, a scanning function, and a printing function. Operational buttons or images 32 as an operation acceptable images (with reference to FIGS. 2A and 2B) which can accept an input of an input object 33 and which correspond to a selected one of the functions are displayed on an LCD 16 of the MFP 1. In the case of an interrupt request for another function, the MFP 1 splits an operational screen or view of the LCD 16 into two parts. Operational buttons 32 corresponding to the function having been selected are displayed on one of the two screens, and operational buttons 32 corresponding to the function having made the interruption are displayed on the other of the two screens. In particular, the MFP 1 as the present embodiment is configured such that even where an arrangement of the operational buttons 32 has been changed by the interrupt request of another function and thereby a user has inadvertently touched or designated an unintentional one of the operational buttons 32, this MFP 1 can prevent execution of a processing not intended by the user. Hereinafter, this MFP 1 will be explained in more detail.

The MFP 1 mainly includes a CPU 10, a ROM 11, a RAM 12, a flash memory 14, operational hard keys 15, the LCD 16, a touch panel 17, a scanner 20, a printer 21, an NCU 23, and a modem 24. The CPU 10, the ROM 11, the RAM 12, and the flash memory 14 are connected to one another via a bus line 26. The operational hard keys 15, the LCD 16, the touch panel 17, the scanner 20, the printer 21, the NCU 23, the modem 24, and the bus line 26 are connected to one another via an input and output port 27.

The CPU 10 is configured to control the various functions of the MFP 1 and the various portions of the MFP 1 which are connected to the input and output port 27, in accordance with fixed values and programs stored in the ROM 11, the RAM 12, or the flash memory 14 or in accordance with various signals transmitted and received via the NCU 23.

The ROM 11 is an unrewritable memory which stores, e.g., an input control program 11a, an operational-button management table 11b, and an operational-button position table 11c. The CPU 10 executes an update processing (with reference to FIG. 3) in accordance with the input control program 11a. The operational-button management table 11b is a table which stores a correspondence between each of the operational buttons 32 (with reference to FIGS. 2A and 2B) displayable on the LCD 16 and one of processings which has been assigned in advance to each operational button 32. The operational-button position table 11c is a table which stores a display area of each operational button 32. The operational buttons 32 will be explained with reference to FIGS. 2A and 2B.

The RAM 12 is a rewritable volatile memory and includes a previous-operation position memory 12a. The previous-operation position memory 12a is a memory which stores one of the operational buttons 32 that has been most recently touched. The previous-operation position memory 12a is updated each time when any of the operational buttons 32 has been touched or designated. The flash memory 14 is a rewritable nonvolatile memory. Each of the operational hard keys 15 is a hard key for inputting a command to the MFP 1. The LCD 16 is a liquid crystal display as a display device including a display panel 16a (with reference to FIGS. 2A and 2B) and configured to display various images on the display panel 16a.

The touch panel 17 as an image-designation (image-selection) detecting device or an approach-touch detecting portion includes a detecting area 17a (with reference to FIGS. 2A and 2B) superposed on the display panel 16a. The touch panel 17 is a capacitive touch panel which detects touch and approach of the input object 33 (with reference to 2A and 2B) such as a user's finger on and toward the detecting area 17a. An entire area of the detecting area 17a is finely divided in a lattice shape into unit areas in each of which an electrostatic sensor is provided. When the input object 33 has approached or touched one of the unit areas, a corresponding one of the electrostatic sensors detects the touch or approach. Coordinates information (an x coordinate and a y coordinate) is brought into correspondence with each unit area in the detecting area 17a on the basis of a coordination system in which a left top of the touch panel 17 is defined as an origin point, a rightward direction is defined as an X-direction, and a downward direction is defined as a Y-direction. The touch panel 17 outputs the coordinates information of the electrostatic sensor which has detected the touch or approach of the input object 33.

It is noted that the touch panel 17 may be superposed or overlaid on an upper face of the display panel 16a so as to be held in close contact with the upper face. Alternatively, a space may be formed between the touch panel 17 and the upper face of the display panel 16a, or the touch panel 17 may be superposed on the display panel 16a with, e.g., a transparency film interposed therebetween.

The scanner 20 is configured to read a document in the facsimile function, the scanning function, or the copying function. The printer 21 is configured to record an image on a recording sheet. The NCU 23 is configured to control a telephone line. The modem 24 is configured to, in transmission of the facsimile, modulate a transmission signal to a form suitable for the transmission in the telephone line, and in receiving of the facsimile, demodulate the modulated signal transmitted from the telephone line.

Figure 2A:
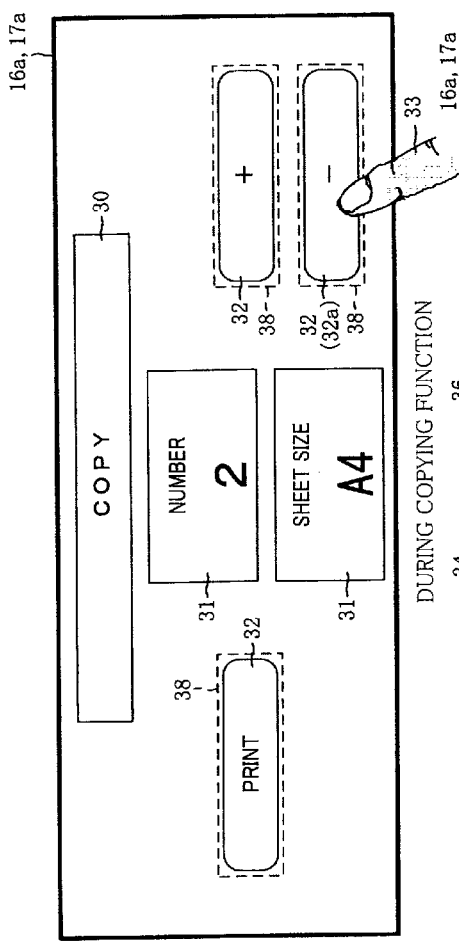
FIG. 2A is a view showing an example of a screen displayed on a display panel of an LCD during the copying function.
Figure 2B:
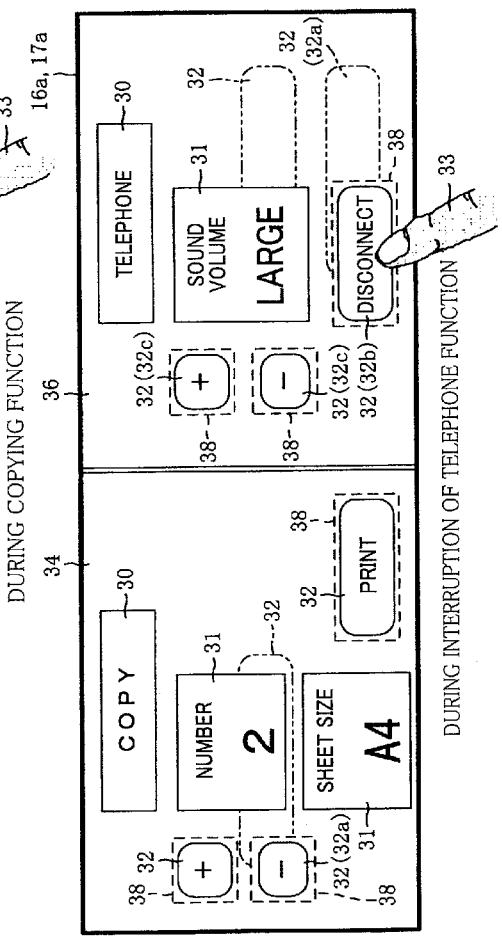
FIG. 2B is a view showing an example of two screens displayed on the display panel of the LCD during interruption of a telephone function.

There will be next explained displays on the display panel 16a with reference to FIGS. 2A and 2B. As shown in FIG. 2A, a single display screen to which a single function is assigned is displayed on an entire area of the display panel 16a, and such a display will be hereinafter referred to as a "full-screen display". Further, as shown in FIG. 2B, the entire area of the display panel 16a is split into two areas to which different functions are respectively assigned, and such a display will be hereinafter referred to as a "two-screen display" or a "split-screen display".

As shown in FIG. 2A, during the full-screen display, function information 30 showing a function being currently selected, set value information 31 showing a set value, and the operational buttons 32 are displayed on the display panel 16a. As described above, the detecting area 17a of the touch panel 17 is superposed on the display panel 16a. Thus, where the user has touched or pressed one of the operational buttons 32 displayed on the display panel 16a with the input object 33, the touch panel 17 detects a position touched by the user (hereinafter may be referred to as an "operated position").

In the MFP 1 as the present embodiment, touching or pressing the display area of the operational button 32 corresponds to a designation or a selection of the operational button 32. The display areas of the respective operational buttons 32 are stored in advance in the operational-button position table 11c. Thus, the MFP 1 specifies a touched or designated one of the operational buttons 32 on the basis of the operated position detected by the touch panel 17 and the display area of the operational button 32. Then, the MFP 1 executes a processing assigned in advance to the specified operational button 32. For example, where one of the operational buttons 32 to which a processing for subtracting one (1) from the set value displayed in a "NUMBER" field (with reference to FIGS. 2A and 2B) is assigned has been touched or operated (the operational button 32 may be hereinafter referred to as a "minus operational button 32a"), the MFP 1 subtracts one (1) from the set value displayed in the "NUMBER" field. It is noted that the MFP 1 stores the operational buttons 32 designated by the operation into the previous-operation position memory 12a (with reference to FIG. 1).

Where the interrupt request of another function has been made during the full-screen display, the MFP 1 updates or changes the display on the display panel 16a to the two-screen display (with reference to FIG. 2B). Here, one of the two screens displayed on the display panel 16a which is related to a function having been displayed since before the update of the display will be hereinafter referred to as an "original screen 34". Further, the other of the two screens which is related to a function having interrupted will be hereinafter referred to as an "interrupt screen 36". It is noted that both of the display areas of the respective operational buttons 32 during the full-screen display and the display areas of the respective operational buttons 32 during the two-screen display are stored in advance in the operational-button position table 11c.

There will be explained a case where the display on the display panel 16a has been updated or changed to the two-screen display when the user is going to touch any one of the operational buttons 32 during the full-screen display shown in FIG. 2A. In this case, there is a possibility that the user inadvertently touches an unintended one of the operational buttons 32 by not noticing the update of the display or by excessive motion even though the arrangement of the operational buttons 32 has been changed.

For example, as shown in FIGS. 2A and 2B, where one of the operational buttons 32 to which a processing for disconnecting a conversation (may be hereinafter referred to as a "disconnecting operational button 32b") is assigned is displayed on an area on which the minus operational button 32a has been displayed before the update of the display. The user may unfortunately touch the disconnecting operational button 32b by mistake even though the user has intended to touch the minus operational button 32a.

In order to solve this problem, the MFP 1 as the present embodiment is configured such that where one of the operational buttons 32 displayed after the update to the two-screen display is touched and where at least a part of the touched operational button 32 displayed after the update is displayed on a display area of another operational button 32 displayed before the update which has a function different from the touched operational button 32, the MFP 1 does not execute the processing corresponding to the touched operational button 32 displayed after the update. That is, the MFP 1 does not accept or receive the user's operation for performing the processing assigned to the operation button 32 touched after the update of the display. Where the MFP 1 is configured in this manner, it is possible to prevent the execution of the processing unintended by the user. It is noted that the MFP 1 stores the touched operational button 32 into the previous-operation position memory 12a regardless of whether or not the processing assigned to the touched operational button 32 is to be executed or not.

Further, the MFP 1 is configured such that where at least a part of the touched operational button 32 displayed after the update is displayed on a display area of another operational button 32 displayed before the update which has a function different from the touched operational button 32, the MFP 1 executes a processing assigned to the operational button 32 displayed before the update. Where the MFP 1 is configured in this manner, the MFP 1 can execute a processing intended by the user.

For example, as shown in FIGS. 2A and 2B, where after the update to the two-screen display the disconnecting operational button 32b is displayed on an area on which the minus operational button 32a has been displayed during the full-screen display, and the user has touched the disconnecting operational button 32b, the MFP 1 cancels the execution of the processing corresponding to the operation for designating the disconnecting operational button 32b, and executes a processing assigned to the minus operational button 32a originally displayed. That is, the MFP 1 executes the processing for subtracting one (1) from the set value of the "NUMBER" field without performing the disconnection of the conversation not desired by the user.

It is noted that where after the update the user has touched the operational button 32 displayed on an area on which no operational buttons 32 have been displayed during the full-screen display, that is, where the user has touched the operational button 32 displayed on an area different from areas on which the operational buttons 32 have been respectively displayed during the full-screen display, the MFP 1 executes a processing assigned to the touched operational button 32.

In the case shown in FIG. 2B, to one of the operational buttons 32 is assigned a processing for increasing or decreasing a set value displayed in a "SOUND VOLUME" field in the interrupt screen 36 (the button 32 may be hereinafter referred to as a "sound-volume operating button 32c"), and a display area of the sound-volume operating button 32c does not overlap with any of the display areas of the respective operational buttons 32 displayed before the update of the display. Where the user has touched such an operational button 32 that does not overlap with any of the display areas of the respective operational buttons 32 displayed before the update of the display, there is a high possibility that the operation of the user is not an erroneous operation. Thus, where the user has touched such an operational button 32, the MFP 1 executes a processing assigned to the operational button 32.

Further, in FIGS. 2A and 2B, operation accepting areas 38 set on the touch panel 17 are each indicated by a broken line. These operation accepting areas 38 are illustrated for easier understanding purposes. Thus, the operation accepting areas 38 are not displayed on the display panel 16a and cannot be visually recognized by the user.

Where the user has touched one of the operation accepting areas 38, the MFP 1 judges that the operational button 32 displayed in the touched operation accepting area 38 has been touched, and executes a processing assigned to the operational button 32. Thus, in the following explanation, touching or designating the operational button 32 includes designating the operation accepting area 38 in addition to designating the operational button 32. Further, where the operation accepting area 38 has been touched or designated, the MFP 1 stores the operational button 32 displayed in the touched operation accepting area 38 into the previous-operation position memory 12a as the touched operational button 32.

Each of the operation accepting areas 38 may be set in the same form and at the same size as a corresponding one of the operational buttons 32, but in the present embodiment each operation accepting area 38 is set at a size slightly larger than the display area of the corresponding operational button 32 so as to contain the operational button 32 and a surrounding area thereof. That is, even where the user has touched a position slightly deviated from the display area of the operational button 32, the MFP 1 judges that the operational button 32 has been touched, and executes a processing intended by the user.

The MFP 1 as the present embodiment is configured such that where the user has touched the operation accepting area 38, an execution of the processing caused by the touch is disabled or made invalid on the same condition as in the case where the operational button 32 in the operation accepting area 38 has been touched. That is, where on the display area of the operational button 32 in the touched operation accepting area 38, at least a part of another operational button 32 has been displayed before the update of the display, the MFP 1 disables or makes ineffective the execution of the processing caused by the touch of the operation accepting area 38. Thus, even where the user has touched a position slightly distant from the operational button 32 during the two-screen display after the update of the display, it is possible to prevent the execution of the processing the user does not intend.

It is noted that when the function interrupted is finished, the MFP 1 updates or changes the display on the display panel 16a from the two-screen display to the full-screen display.

There will be next explained the update processing executed by the CPU 10 of the MFP 1 with reference to the flow-chart shown in FIG. 3. This update processing is a processing for updating the display on the display panel 16a to the two-screen display and executing various processing based on a user's operation when the interrupt request of a function different from a function being selected has been made, for example.

Initially in S302, the CPU 10 judges whether a predetermined interrupt request such as an incoming call has been made or not. Where the CPU 10 has judged that the predetermined interrupt request has not been made (S302: No), the CPU 10 performs a normal operation in S316. Here, performing the normal operation means that where any of the operational buttons 32 has been touched or designated, the MFP 1 executes a processing assigned to the touched operational button 32.

On the other hand, where the CPU 10 has judged that the predetermined interrupt request has been made (S302: Yes), the CPU 10 performs in S304 an interrupt operation. Then, in S305, the CPU 10 updates the display on the display panel 16a from the full-screen display to the two-screen display.

Then, in S306, the CPU 10 judges whether or not any operational button 32 is displayed, after the update, on an area overlaying the operational button 32 which has been displayed before the update and which is different from the operational button 32 displayed after the update. In other words, the CPU 10 judges whether or not at least a part of the operational buttons 32 displayed after the update of the display is displayed on a display area of another operational button 32 displayed before the update of the display. Where the CPU 10 has made a negative decision in S306 (S306: No), the CPU 10 performs the normal operation in S316.

On the other hand, where the CPU 10 has made an affirmative decision in S306 (S306: Yes), the CPU 10 judges in S308 whether successive operations have been performed or not. Specifically, the CPU 10 judges whether a current operation has been performed within a predetermined succession judgment time from a previous operation. Where the CPU 10 makes the judgment of S308 for the first time after the update to the two-screen display, the CPU 10 judges whether or not the successive operations have been performed during a period from before the update of the display to after the update of the display with the time of the update included. Where the CPU 10 makes the judgment of S308 for the second or subsequent times after the update to the two-screen display, the CPU 10 judges whether or not the successive operations have been performed after the update.

Where the CPU 10 has judged that the successive operations have been performed (S308: Yes), the CPU 10 judges in S309 whether or not an operational button 32 the same as an operational button 32 last touched has been touched by the successive operations. Where the CPU 10 makes the judgment in S309 for the first time after the update to the two-screen display (S305), the CPU 10 judges whether or not the display area of the operational button 32 touched by the operation before the update of the display and the display area of the operational button 32 touched by the operation after the update of the display are superposed on or overlap with each other. Where the CPU 10 has judged that these two display area are superposed on or overlap with each other, the CPU 10 makes the affirmative decision in S309. Where the CPU 10 makes the judgment in S309 for a second or subsequent times, the CPU 10 does not update the display, and thus positions of the respective operational buttons 32 displayed on the display panel 16a are not changed. Accordingly, the CPU 10 needs only to make the judgment for a type of the operational button 32. As described above, the previous-operation position memory 12a stores the operational button 32 touched by the last or previous operation. Thus, where the operational button 32 touched by the last operation and the operational button 32 touched by the current operation are the same as each other, the CPU 10 makes an affirmative decision in S309.

Where the CPU 10 has made the affirmative decision (S309: Yes), the CPU 10 disables or inhibits in S312 the execution of the processing responsive to the touch of the operational button 32 displayed after the update and executes a processing assigned to the operational button 32 displayed at the operated position before the update to the two-screen display. That is, the CPU 10 executes again the processing executed by the operation before the update of the display.

Then, the update processing returns to S308, and the CPU 10 repeats the processings from S308. That is, during the successive touches on the same operational button 32 after the update of the display, the CPU 10 disables or invalidates all the executions of the processings corresponding to the operations and repeatedly executes the processing executed by the operation before the update of the display.

For example, there will be explained a case where the display is updated to the two-screen display while the user is successively touching the minus operational button 32a during the full-screen display shown in FIG. 2A, and then the disconnecting operational button 32b is newly displayed on an area on which the minus operational button 32a has been displayed before the update to the two-screen display. Where the user performing the successive operations does not carefully look at the display panel 16a, the user may unintentionally continue the successive operations without noticing that the disconnecting operational button 32b has been newly displayed on the operated position.

Even in this case, in the update processing in the present embodiment, the CPU 10 disables the execution of the processing corresponding to the touch on the disconnecting operational button 32b during the successive touches on the disconnecting operational button 32b displayed at the area overlapping with the minus operational button 32a and executes the processing assigned to the minus operational button 32a each time when the disconnecting operational button 32b is touched. Thus, the MFP 1 can perform the processing intended by the user even though the user has made the operational error.

On the other hand, where the CPU 10 has judged that the successive operations have not been performed (S308: No), that is, where, after the previous operation, the current operation has not been performed within the predetermined succession judgment time, or where the CPU 10 has made a negative decision in S309 (S309: No), that is, where the display area of the operational button 32 touched by the previous operation and the display area of the operational button 32 touched by the current operation do not overlap with each other though the successive operations have been performed, the CPU 10 judges in S314 whether a predetermined length of time has passed from the update of the display or not.

Where the CPU 10 has judged that the predetermined length of time has not passed (S314: No), that is, in the case within the predetermined length of time after the update of the display, the CPU 10 disables in S315 the execution of the processing corresponding to the touch of the operational button 32. Then, the CPU 10 specifies the operational button 32 displayed on the display area of the touched operational button 32 before the update of the display and executes a processing assigned to the specified operational button 32. Then, in S316, the CPU 10 performs the normal operation after the predetermined length of time has passed after the update of the display, and this update processing returns to S302.

Thus, in the case within the predetermined length of time after the update of the display, even where the user has inadvertently touched the operational button 32, it is possible to prevent the execution of the processing unintended by the user. It is noted that though not explained in the flow-chart in FIG. 3, even in the case within the predetermined length of time after the update of the display, where the user has touched the operational button 32 displayed on an area not overlapping with any of the display areas of the respective operational buttons 32 before the update of the display, the CPU 10 executes a processing assigned to the touched operational button 32.

On the other hand, where the CPU 10 has judged that the predetermined length of time has passed (S314: Yes), the CPU 10 performs the normal operation in S316, and this update processing returns to S302. This is because there is a low possibility that the user inadvertently touches the operational button 32 after the predetermined length of time has passed after the update of the display while there is a high possibility that the user inadvertently touches the operational button 32 without noticing the update of the display within the predetermined length of time after the update of the display.

According to the MFP 1 as the first embodiment, even where the user has inadvertently touched the operational button 32 owing to the update to the two-screen display during the successive operations or even where the user has inadvertently touched the operational button 32 without noticing the update of the display, it is possible to prevent the execution of the processing unintended by the user because the CPU 10 disables the execution of the processing corresponding to the touch.

Figure 4:
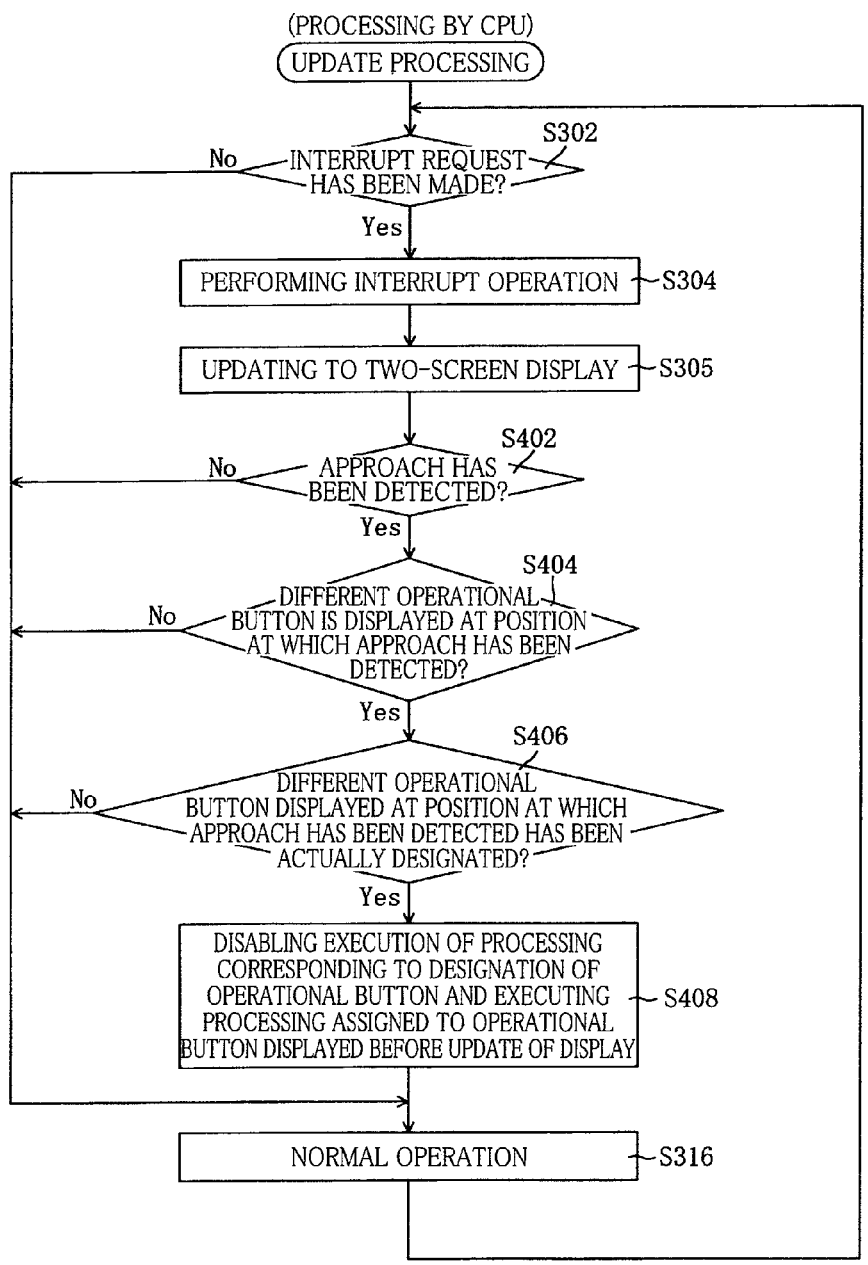
FIG. 4 is a flow-chart showing an update processing executed by a CPU of an MFP as a second embodiment.

There will be next explained an MFP 1 as a second embodiment with reference to a flow-chart shown in FIG. 4. The MFP 1 as the second embodiment utilizes the configuration in which the touch panel 17 can detect not only the touch of the finger of the user but also the approach thereof. It is noted that since an electric construction of the MFP 1 as the second embodiment is the same as that of the MFP 1 as the first embodiment explained with reference to FIG. 1, and a screen displayed on the display panel 16a of the MFP 1 as the second embodiment is the same as that explained with reference to FIGS. 2A and 2B, drawings and a detailed explanation thereof are dispensed with.

There will be next explained an update processing executed by the CPU 10 of the MFP 1 as the second embodiment with reference to FIG. 4. It is noted that the same reference numerals as used in the flow-chart shown in FIG. 3 are used to designate the corresponding steps of the flow-chart shown in FIG. 4, and an explanation of which is dispensed with. The update processing in the second embodiment is a processing in which where the display has been updated in a state in which the touch or designation of the operational button 32 is expected or predicted, and another operational button 32 displayed after the update to the two-screen display has been touched or designated by an operation after the update of the display, the CPU 10 disables an execution of a processing corresponding to the touch of said another operational button 32.

Initially in S402, the CPU 10 judges whether or not the touch panel 17 has detected the approach of the input object 33 such as a user's finger since before the update to the two-screen display. It is noted that the MFP 1 stores a result of the detection of the touch panel 17 in, e.g., the RAM 12 for a specific time period, and the CPU 10 makes the judgment in S402 by referring a result of past detections stored in the RAM 12. Where the CPU 10 has judged that the touch panel 17 has not detected the approach of the input object 33 (S402: No), that is, where the touch panel 17 has not detected the approach of the input object 33 since before the update to the two-screen display, the CPU 10 performs the normal operation in S316.

On the other hand, where the CPU 10 has judged that the touch panel 17 has detected the approach of the input object 33 (S402: Yes), the CPU 10 judges in S404 whether or not an operational button 32 different from the operational button 32 displayed before the update of the display is being displayed at a position at which the approach of the input object 33 has been detected.

Where the CPU 10 has made a negative decision in S404 (S404: No), the CPU 10 performs the normal operation in S316. On the other hand, where the CPU 10 has made an affirmative decision in S404 (S404: Yes), that is, where another operational button 32 is being newly displayed at a position at which the approach of the input object 33 has been detected, the user may unintentionally touches another operational button 32 newly displayed even though the user intended to touch the operational button 32 displayed before the update of the display.

As thus described, in a state in which the touch or designation of another operational button 32 newly displayed is expected, the CPU 10 judges in S406 whether or not this operational button 32 newly displayed has been actually touched or designated by an operation performed within a predetermined length of judgment time after the update to the two-screen display. That is, the CPU 10 judges whether or not the input object 33 has been actually brought into contact with a position at which the approach of the input object 33 has been detected.

Where the CPU 10 has made a negative decision in S406 (S406: No), that is, where the operational button 32 newly displayed has not been actually touched within the predetermined length of judgment time after the update to the two-screen display, the CPU 10 performs the normal operation in S316. On the other hand, where the CPU 10 has made an affirmative decision in S406 (S406: Yes), the CPU 10 disables in S408 an execution of a processing corresponding to the touch of the operational button 32 displayed after the update and executes a processing assigned to the operational button 32 displayed before the update of the display. Then, the CPU 10 performs the normal operation in S316 and repeats the processings from S302. That is, in the update processing in the second embodiment, the CPU 10 does not execute a processing corresponding to a first operation to designate the operational button 32 after the update of the display but executes processings corresponding to second or subsequent operations.

According to the update processing in the second embodiment, it is possible to prevent the execution of the processing unintended by the user even where the display has been suddenly updated in a state in which the input object 33 is approaching the display panel 16a in order to touch or designate an operational button 32.

It is noted that the CPU 10 may judge that the designation of the operational button 32 is expected within the succession judgment time even where the CPU 10 has made the negative decision in S402 because of lack of the detection of the approach of the input object 33 in the case where the update to the two-screen display has been made during a plurality of touches or designations of the same operational button 32 during the successive operations, that is, within the predetermined succession judgment time. In this case, the CPU 10 judges, instead of the judgment in S404 shown in FIG. 4, whether or not another operational button 32 has been displayed on the display area of the successively operated operational button 32 after the update of the display, and the CPU 10 judges, instead of the judgment in S406, judges whether or not said another operational button 32 has been actually touched or designated. Further, where the CPU 10 has judged that said another operational button 32 has been actually touched, the CPU 10 may disable an execution of a processing corresponding to the touch.

Figure 5:
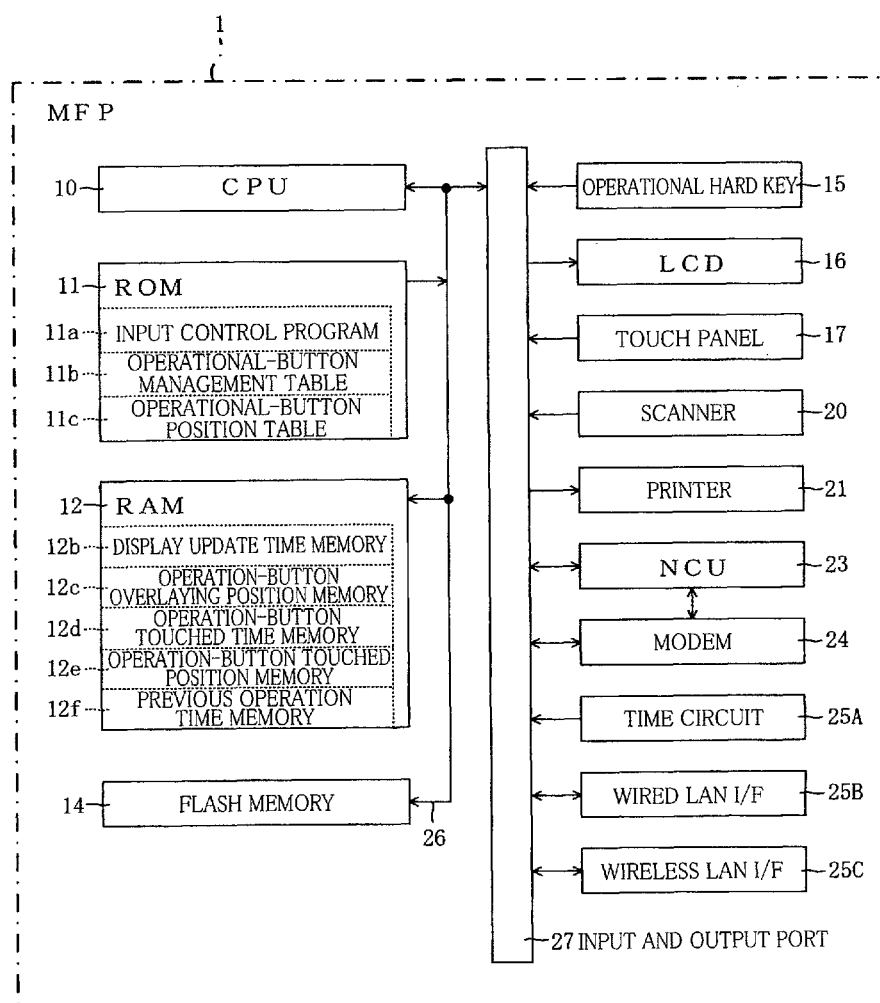
FIG. 5 is a block diagram showing an electric construction of an MFP as a third embodiment.

There will be next explained a third embodiment of the present invention. FIG. 5 is a block diagram showing an electric construction of an MFP 1 as the third embodiment of the present invention. It is noted that the same reference numerals as used in the MFP 1 as the first embodiment are used to designate the corresponding elements of the MFP 1 as the third embodiment shown in FIG. 5, and an explanation of which is dispensed with.

The MFP 1 as the third embodiment includes a time circuit 25A, a wired LAN interface 25B (hereinafter may be referred to as a "wired LAN I/F 25B"), and a wireless LAN interface 25C (hereinafter may be referred to as a "wireless LAN I/F 25C"). The time circuit 25A, the wired LAN I/F 25B, and the wireless LAN I/F 25C are connected to the input and output port 27.

The time circuit 25A is a circuit storing or registering a current time (including a date). The wired LAN I/F 25B is an interface for connecting the MFP 1 to an internet or a LAN line by a wired connection. The wireless LAN I/F 25C is an interface for connecting the MFP 1 to the internet or the LAN line by a wireless connection.

In the MFP 1 as the third embodiment, the CPU 10 executes an interrupt processing (with reference to FIG. 6) and an operational-button touched processing (with reference to FIG. 7) which will be described below, in accordance with the input control program 11a stored in the ROM 11.

Further, in the MFP 1 as the third embodiment, the RAM 12 includes a display update time memory 12b, an operation-button overlaying position memory 12c, an operation-button touched time memory 12d, an operation-button touched position memory 12e, and a previous operation time memory 12f. The display update time memory 12b stores a latest or newest one of times at each of which the display on the display panel 16a (with reference to FIGS. 2A and 2B) of the LCD 16 has been updated to the two-screen display. Where any of the display areas of the respective operational buttons 32 during the full-screen display before the update of the display and any of the display areas of the respective operational buttons 32 during the two-screen display after the update of the display are overlaid on or overlap with each other, the operation-button overlaying position memory 12c stores a position or positions of the overlapping display area(s). The operation-button touched time memory 12d stores a time at which the operational button 32 has been touched or pressed. The operation-button touched position memory 12e stores a position touched at the time stored in the operation-button touched time memory 12d. The previous operation time memory 12f stores a time at which the display panel 16a has been most recently touched among times at each of which the display panel 16a has been touched.

Figure 6:
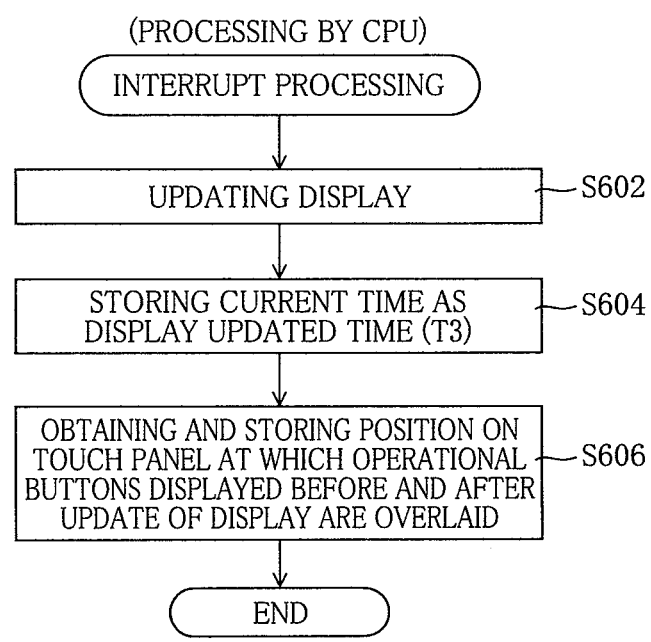
FIG. 6 is a flow-chart showing an interrupt processing executed by the CPU of the MFP as the third embodiment.

There will be next explained the interrupt processing executed by the CPU 10 of the MFP 1 with reference to the flow-chart shown in FIG. 6. This interrupt processing is a processing started when the MFP 1 has received a request from an external device communicable with this MFP 1. In the interrupt processing, the display on the display panel 16a is updated to the two-screen display in accordance with the request from the external device communicable with the MFP 1. It is assumed that at the time before a start of this interrupt processing, the full-screen display related to the current selected function is performed on the display panel 16a.

It is noted that the wording "the request from the external device communicable with this MFP 1" means a request inputted to the MFP 1 from a device other than input devices of the MFP 1 such as the operational hard keys 15 and the touch panel 17, that is, from a user other than the user operating this MFP 1. Thus, updating the display on the display panel 16a in the following cases corresponds to a specific example of the case where the display on the display panel 16a is updated in accordance with the request from the external device communicable with the MFP 1: a case where the MFP 1 receives an incoming call from the external device while the copying function is being selected (that is, a case where the MFP 1 receives a calling request from the external device); a case where the MFP 1 receives a printing request from the external device such as a personal computer via the wired LAN I/F 25B or the wireless LAN I/F 25C while the copying function is being selected; a case where the MFP 1 receives a request for scanning and capturing an image by the scanner 20 while the copying function is being selected; and a case where the MFP 1 receives facsimile data from the external device via the telephone line, not shown (that is, a case where the MFP 1 receives a facsimile communication request) while the copying function is being selected, for example.

When the MFP 1 receives the request from the external device communicable with the MFP 1, the CPU 10 updates in S602 the display on the display panel 16a from the full-screen display to the two-screen display.

Then in S604, the CPU 10 obtains the current time from the time circuit 25A and stores the obtained current time into the display update time memory 12b as a display updated time (T3). Then in S606, the CPU 10 obtains a position or positions on the touch panel 17 at which any of the operational buttons 32 displayed before the update of the display and any of the operational buttons 32 displayed after the update of the display are overlaid on or overlap with each other. Then, the CPU 10 stores the obtained position(s) into the operation-button overlaying position memory 12c, and the interrupt processing is finished. It is noted that the CPU 10 obtains the overlaying position(s) of the operational buttons 32 as a position or positions on the touch panel 17, but this MFP 1 may be configured such that the CPU 10 obtains the overlaying position(s) of the operational buttons 32 as a position or positions on the display panel 16a. Further, the MFP 1 may be configured such that the CPU 10 obtains, instead of the overlaying position(s) of the operational buttons 32, an overlaying position(s) of the operation accepting areas 38 and stores the obtained overlaying position(s) into the operation-button overlaying position memory 12c.

Figure 7:
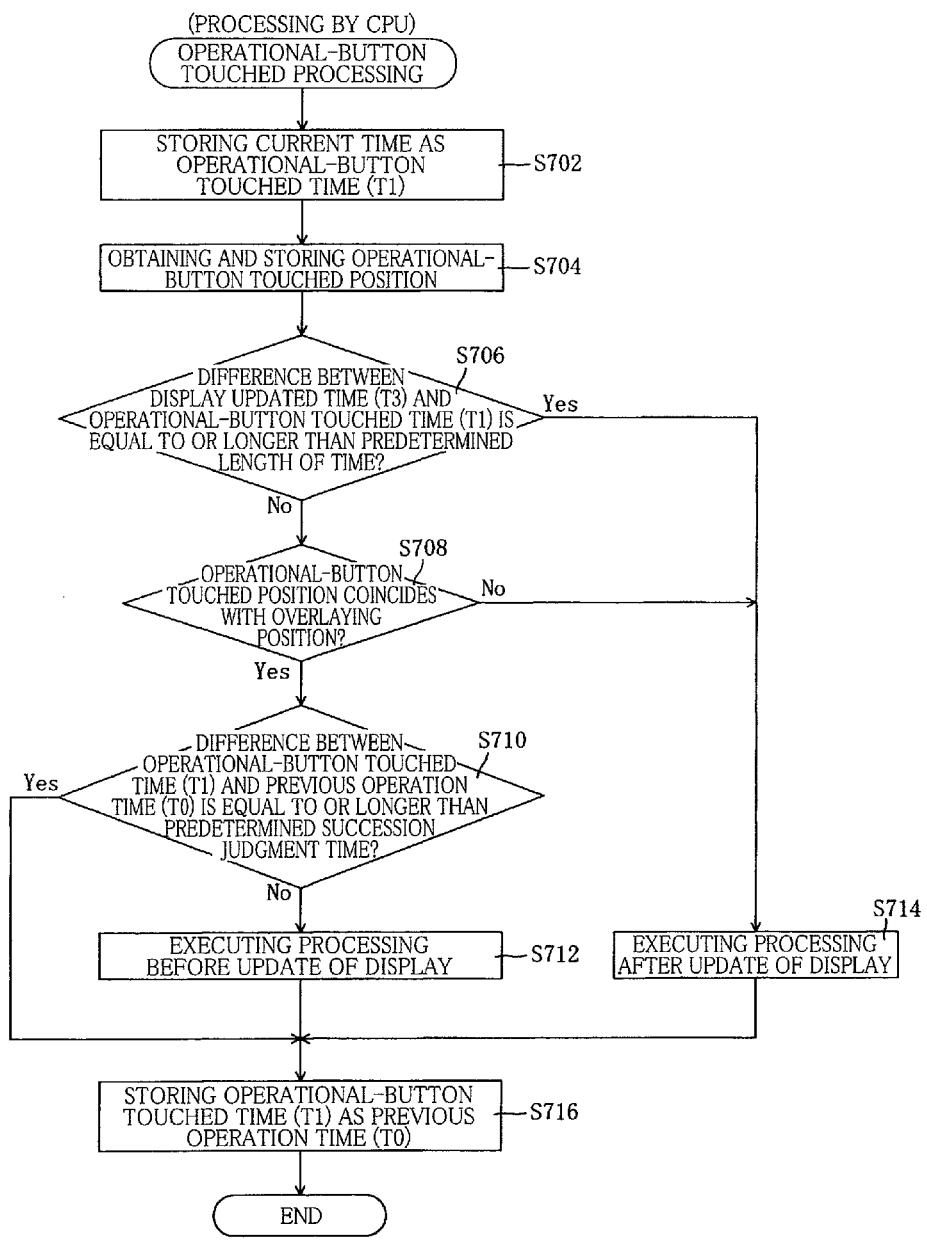
FIG. 7 is a flow-chart showing an operational-button touched processing performed by the CPU of the MFP as the third embodiment.

There will be next explained the operational-button touched processing executed by the CPU 10 of the MFP 1 with reference to the flow-chart shown in FIG. 7. This operational-button touched processing is a processing executed where the user has touched any of the operational buttons 32. This operational-button touched processing is executed at a timing independently of the interrupt processing (with reference to FIG. 6).

Initially in S702, the CPU 10 obtains the current time from the time circuit 25A and stores the obtained current time into the operation-button touched time memory 12d as an operational-button touched time (T1). Then in S704, the CPU 10 obtains an operational-button touched position detected by the touch panel 17 and stores the obtained operational-button touched position into the operation-button touched position memory 12e.

Then, in S706, the CPU 10 judges whether a difference between the display updated time (T3) and the operational-button touched time (T1) is equal to or longer than a predetermined length of time (e.g., two seconds) or not. Where the CPU 10 has judged that the difference between the display updated time (T3) and the operational-button touched time (T1) is shorter than the predetermined length of time (S706: No), the CPU 10 judges in S708 whether or not the operational-button touched position stored in the operation-button touched position memory 12e coincides with any of the overlaying position(s) of the operational button(s) 32 stored in the operation-button overlaying position memory 12c.

It is noted that, in the judgment in S708, the operational-button touched position does not need to completely coincide with any of the overlaying position(s) of the operational button(s) 32. That is, where the operational-button touched position (that is, an area at which the touch of the input object 33 has been detected) at least partly coincides with or overlaps with any of the overlaying position(s) of the operational button(s) 32, the CPU 10 makes an affirmative decision in S708.

Where the CPU 10 has judged that the operational-button touched position coincides with any of the overlaying position(s) of the operational button(s) 32 (S708: Yes), the CPU 10 judges in S710 whether a difference between the operational-button touched time (T1) and a previous operation time (T0) stored in the previous operation time memory 12f is equal to or longer than the predetermined succession judgment time (e.g., 0.5 seconds) or not.

Where the CPU 10 has judged that the difference between the operational-button touched time (T1) and the previous operation time (T0) is equal to or longer than the predetermined succession judgment time (S710: Yes), the CPU 10 disables the execution of the processing corresponding to the touch, and this operational-button touched processing goes to S716.

On the other hand, where the CPU 10 has judged that the difference between the operational-button touched time (T1) and the previous operation time (T0) is shorter than the predetermined succession judgment time (S710: No), that is, where the CPU 10 has judged that the successive operations have been performed within the period from before the update of the display to after the update of the display with the time of the update included, the CPU 10 executes in S712 a processing assigned to the operational button 32 displayed at a current operated position before the update to the two-screen display, and this operational-button touched processing goes to S716. That is, the CPU 10 disables the execution of the processing corresponding to the designation of the operational button 32 after the update.

On the other hand, where the CPU 10 has judged that the difference between the display updated time (T3) and the operational-button touched time (T1) is equal to or longer than the predetermined length of time (S706: Yes), or where the CPU 10 has judged that the operational-button touched position stored in the operation-button touched position memory 12e does not coincide with any of the overlaying position(s) of the operational button(s) 32 stored in the operation-button overlaying position memory 12c (S708: No), the CPU 10 executes in S714 a processing assigned to the touched operational button 32, and this operational-button touched processing goes to S716

Then in S716, the CPU 10 stores the operational-button touched time (T1) stored in the operation-button touched time memory 12d into the previous operation time memory 12f as the previous operation time (T0), and the operational-button touched processing is finished.

According to the MFP 1 as the third embodiment, as in the case with the MFP 1 as the first embodiment, even where the user has inadvertently touched the operational button 32 owing to the update to the two-screen display during the successive operations or even where the user has inadvertently touched the operational button 32 without noticing the update of the display, it is possible to prevent the execution of the processing unintended by the user because the CPU 10 disables the execution of the processing corresponding to the touch.

Figure 8:
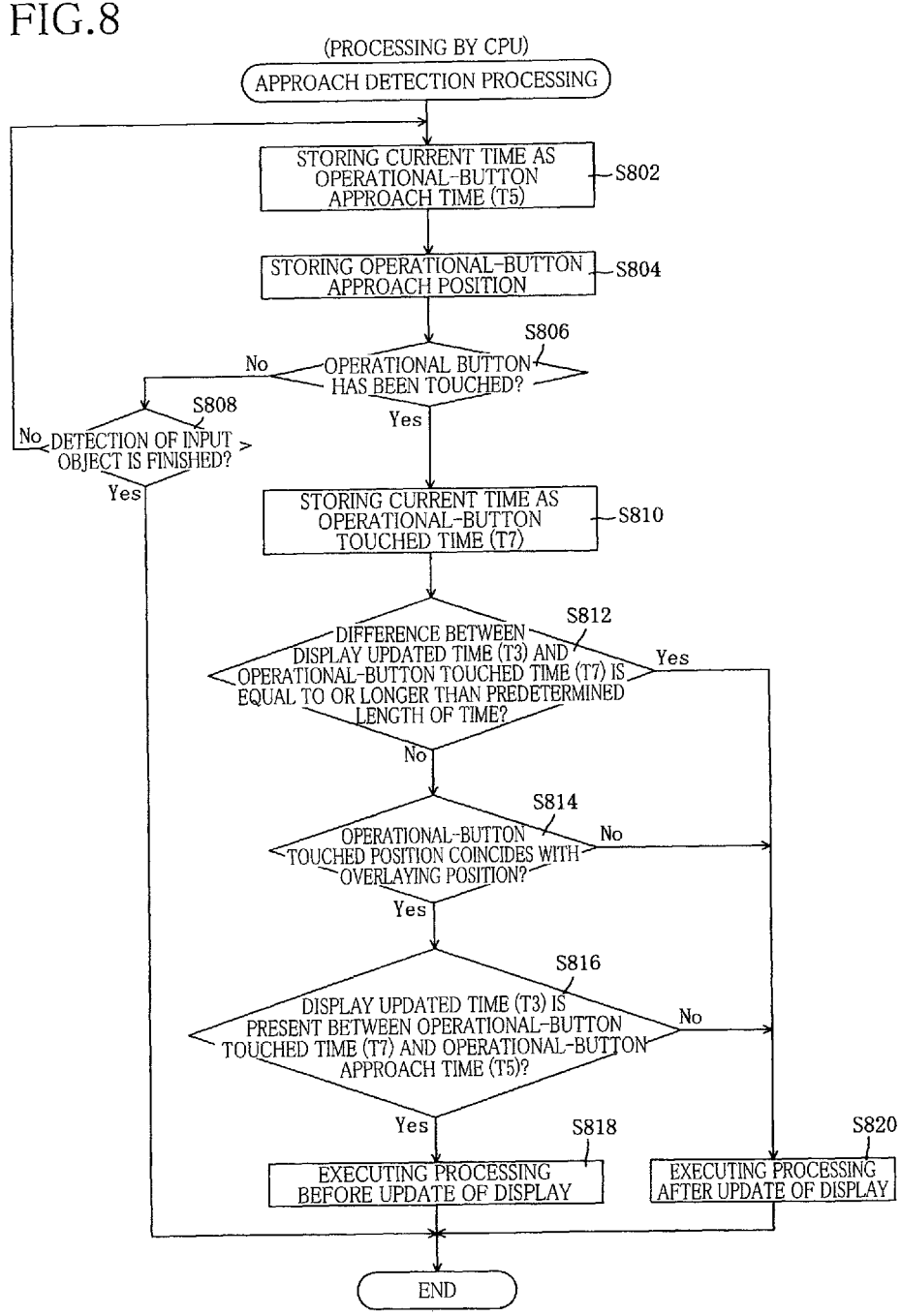
FIG. 8 is a flow-chart showing an approach detection processing executed by a CPU of an MFP as a fourth embodiment.

There will be next explained a fourth embodiment. FIG. 8 is a flow-chart showing an approach detection processing executed by the CPU 10 of the MFP 1 as this fourth embodiment. It is noted that a block diagram showing an electric construction of the MFP 1 as the fourth embodiment is the same as that of the MFP 1 as the third embodiment explained with reference to FIG. 5, and the interrupt processing executed by the CPU 10 of the MFP 1 as the fourth embodiment is the same as that executed by the CPU 10 of the MFP 1 as the third embodiment explained with reference to FIG. 6. Thus, drawing and an explanation thereof are dispensed with.

The approach detection processing shown in FIG. 8 is a processing executed where the touch panel 17 has detected an approach of the input object 33 to the display panel 16a. This approach detection processing is executed at a timing independently of the interrupt processing (with reference to FIG. 6).

Initially in S802, the CPU 10 obtains the current time from the time circuit 25A and stores the obtained current time into the RAM 12 as an operational-button approach time (T5). Then in S804, the CPU 10 obtains an approach position of the input object 33 which has been detected by the touch panel 17 and stores the obtained approach position into the RAM 12 as an operational-button approach position. Then in S806, the CPU 10 judges whether the operational button 32 located at the operational-button approach position has been actually touched or not. That is, the CPU 10 judges whether the input object 33 has been actually brought into contact with the detected approach position or not. Where the CPU 10 has judged that the operational button 32 located at the operational-button approach position has not been actually touched (S806: No), the CPU 10 judges in S808 whether the detection of the input object 33 by the touch panel 17 is finished or not. Where the CPU 10 has judged that the detection of the input object 33 by the touch panel 17 is finished (S808: Yes), the approach detection processing is finished.

On the other hand, where the CPU 10 has judged that the detection of the input object 33 by the touch panel 17 is not finished (S808: No), this approach detection processing returns to S802, and the CPU 10 updates the operational-button approach time (T5) and the operational-button approach position (S802, S804).

Where the operational button 32 located at the operational-button approach position has been actually touched during the repeat of the above-explained processings (S806: Yes), the CPU 10 obtains in S810 the current time from the time circuit 25A as an operational-button touched time (T7) and stores the obtained current time into the operation-button touched time memory 12d. Then in S812, the CPU 10 judges whether a difference between the display updated time (T3) and the operational-button touched time (T7) is equal to or longer than the predetermined length of time (e.g., two seconds) or not. Where the CPU 10 has judged that the difference between the display updated time (T3) and the operational-button touched time (T7) is shorter than the predetermined length of time (S812: No), the CPU 10 judges in S814 whether or not the operational-button touched position coincides with any of the overlaying position(s) of the operational button(s) 32 stored in the operation-button overlaying position memory 12c.

Where the CPU 10 has judged that the operational-button touched position coincides with any of the overlaying position(s) of the operational button(s) 32 stored in the operation-button overlaying position memory 12c (S814: Yes), the CPU 10 judges in S816 whether or not the display updated time (T3) is present between the operational-button touched time (T7) and the operational-button approach time (T5). That is, the CPU 10 judges whether the input object 33 starts to approach before the update of the display and has been brought into contact with the touch panel 17 after the update of the display. Where the CPU 10 has judged that the display updated time (T3) is present between the operational-button touched time (T7) and the operational-button approach time (T5) (S816: Yes), that is, where the CPU 10 has judged that the touch of the operational button 32 is a first operation after the update of the display, the CPU 10 executes in S818 a processing assigned to the operational button 32 displayed at the current operated position before the update to the two-screen display, and the approach detection processing is finished. That is, the CPU 10 disables the execution of the processing corresponding to the touch of the operational button 32.

On the other hand, where the CPU 10 has judged that the difference between the display updated time (T3) and the operational-button touched time (T7) is equal to or longer than the predetermined length of time (S812: Yes), or where the CPU 10 has made a negative decision in any of S814 and S816 (S814, S816: No), the CPU 10 executes in S820 a processing assigned to the touched operational button 32, and the approach detection processing is finished.

According to the MFP 1 as the fourth embodiment, as in the case with the MFP 1 as the second embodiment, it is possible to prevent the execution of the processing unintended by the user even where the display has been suddenly updated in a state in which the input object 33 such as the user's finger is approaching the display panel 16a in order to touch or designate an operational button 32.

In view of the above, the CPU 10 can be considered to have a processing executing section configured to, where at least one operational button 32 has been designated, execute a processing assigned to the designated operational button 32, and the processing executing section can be considered to perform S316. Further, the CPU 10 can be considered to have a display updating section configured to update the display on the LCD 16 from a state in which the at least one operational button 32 has been displayed on the LCD 16, and the display updating section can be considered to perform S305. Further, the CPU 10 can be considered to have a disabling section configured to, where the touch panel 17 has detected a designation of the operational button 32 which has been displayed after the update and which is different from the operational button 32 displayed before the update, disable the execution of the processing assigned to the designated operational button 32, and the disabling section can be considered to perform S312 and S315.

Further, the CPU 10 can be considered to have a request-response updating section configured to update the display in response to a request from an external device with which the MFP 1 is enabled to communicate, and the request-response updating section can be considered to perform S304. Further, the CPU 10 can be considered to have a display-area judging section configured to judge whether or not at least a part of the operational button 32 displayed after the update is displayed on the display area of the operational button 32 displayed before the update, and the display-area judging section can be considered to perform S309. Further, the CPU 10 can be considered to have a before-update image processing executing section configured to, in a case where the designation of the operational button 32 after the update has been detected, where at least a part of the operational button 32 displayed after the update has been displayed on the display area, execute a processing assigned to the operational button 32 displayed on the display area before the update, and the before-update image processing executing section can be considered to perform S312. Further, the CPU 10 can be considered to have a predetermined-period judging section configured to, where the operational button 32 displayed after the update has been designated, judge whether or not the designation has been performed within a predetermined period of time from a time of the update, and the predetermined-period judging section can be considered to perform S314.

Further, the CPU 10 can be considered to have a successive designation judging section configured to judge whether or not the successive designations of the operational button 32 displayed before the update and the operational button 32 displayed after the update have been performed during the period from before the update to after the update, and the successive designation judging section can be considered to perform S308. Further, the CPU 10 can be considered to have an expecting section configured to expect the designation of the operational button 32 displayed before the update on the basis of the detection of the approach of the input object 33, and the expecting section can be considered to perform S404.

While the embodiments of the present invention has been described above, it is to be understood that the invention is not limited to the details of the illustrated embodiment, but may be embodied with various changes and modifications, which may occur to those skilled in the art, without departing from the spirit and scope of the invention.

For example, in the above-described embodiments, the MFP 1 which can be operated by the touch panel 17 is an example of an input apparatus to which the present invention is applied. However, where a personal computer operated by, e.g., a mouse or a key board is an example of the input apparatus, the present invention is also applicable to such an input apparatus. In this case, image elements such as an icon displayed on a display panel of a display device connected to the personal computer correspond to an example of the operational image. Further, a double-click with a pointer positioned on the operational image and pressing down an enter key of the key board with the operational image being selected correspond to an example of an operation for designating the operational image. In this example, the input apparatus may be configured such that a state in which an indicator such as a pointer displayed on the display panel 16a is indicating the operational image such as an icon is set as a state in which a designation of the operational image is being expected, and where a display has been updated in such a state and the operational image displayed after the update of the display has been designated, the input apparatus disables an execution of a processing corresponding to the designation of the operational image displayed after the update of the display.

Further, in the above-described embodiments, the update of the display means the split of the screen of the display panel 16a, but the present invention is not limited to this configuration. That is, the update of the display includes a case where at least a part of display on the display panel is changed to such an extent that the user can visually recognize the change. For example, displaying an image element such as a pop-up window or a dialog box so as to overlap with an image originally displayed also corresponds to an example of the update of the display.

Further, in the above-described embodiments, after the update of the display from the full-screen display to the two-screen display, the execution of the processing corresponding to the designation of the operational button 32 is disabled. However, the MFP 1 may be configured such that the execution of the processing corresponding to the designation of the operational button 32 is disabled also in the case where the display has been updated from the two-screen display to the full-screen display.

Further, the MFP 1 may be configured such that among the operational buttons 32 displayed after the update of the display, the operational button(s) 32 for which the execution of the processing is disabled and the operational button(s) 32 for which the execution of the processing is enabled or made valid are displayed in different manners. Where the MFP 1 is thus configured, it is visually obvious which operational buttons 32 can be designated, thereby improving an operability of the user. For example, where the operational button(s) 32 for which the execution of the processing is disabled is or are grayed out or displayed in a translucent manner, the user can visually recognize that the operational button(s) 32 cannot be operated.

Further, the MFP 1 as the above-described embodiments is configured such that where the execution of the processing corresponding to the designation of the operational button 32 is disabled, the CPU 10 executes the processing assigned to the operational button 32 displayed on the display area of the designated operational button 32 before the update of the display. As thus described, where the CPU 10 executes the processing assigned to the operational button 32 different from the designated operational button 32, the different operational button 32 may be grayed out or displayed in the translucent manner.

Further, the MFP 1 as the above-described embodiments is configured such that where the execution of the processing corresponding to the designation of the operational button 32 is disabled, the CPU 10 executes another processing assigned to the operational button 32 displayed on the display area of the designated operational button 32 before the update of the display. However, the MFP 1 may be configured so as to disable the execution of the processing corresponding to the designation of the operational button 32 without executing said another processing.

Further, in the above-described embodiments, where on the display area of the operational button 32 touched after the update of the display is displayed at least a part of the operational button 32 to which a different processing is assigned before the update of the display, the execution of the processing corresponding to the designation of the operational button 32 touched after the update of the display is disabled. However, instead of this configuration, the MFP 1 may be configured such that where the display area (size) of the operational button 32 designated after the update of the display and the display area of the operational button 32 displayed before the update of the display are overlaid on or overlap with each other in equal to or larger than a predetermined area (size), the CPU 10 disables the execution of the processing corresponding to the designation of the operational button 32.

Further, the MFP 1 may be configured such that where a distance between the display area of the operational button 32 designated after the update of the display and the display area of the operational button 32 to which a different processing is assigned and which has been displayed before the update of the display is shorter than a predetermined threshold value, the CPU 10 disables the execution of the processing corresponding to the designation of the operational button 32.

Further, in the above-described embodiments, where the operation for designating the operational button 32 has been detected by the touch panel 17, the CPU 10 does not execute the processing assigned to the operational button 32, which corresponds to disabling of the execution of the processing corresponding to the operation. However, instead of this configuration, the MFP 1 may be configured such that the CPU 10 disables the execution of the processing corresponding to the operation of the operational button 32 since before the designation of the operational button 32. For example, the MFP 1 may be configured such that the execution of the processing corresponding to the operation is disabled by interrupting input signals of the electrostatic sensor located on the display area of the operational button 32 among the electrostatic sensors constituting the touch panel 17 so as not to accept the operation for designating the operational button 32.

Further, the MFP 1 may be configured such that where the interrupt screen 36 displayed after the update of the display has been operated, the CPU 10 disables all the operations. In this case, the MFP 1 may be configured to turn off the electrostatic sensors located on an area on the detecting area 17a which corresponds to the interrupt screen 36.

Further, in the above-described embodiments, where on the display area of the operational button 32 designated after the update of the display is displayed at least a part of the operational button 32 to which a different processing is assigned before the update of the display, the operation for designating the operational button 32 is disabled without exception. However, for an operational button 32 satisfying such a condition and displayed at a different position after the update of the display since before the update of the display (e.g., the minus operational button 32a shown in FIGS. 2A and 2B), the CPU 10 executes a processing assigned to such an operational button 32.

Further, in the above-described embodiments, the wording "successive operations" means that the display panel 16a is operated a plurality of times within the predetermined succession judgment time, but the present invention is not limited to this configuration. That is, any operation may be employed as the "successive operations" as long as an instruction for repeatedly executing the same processing can be inputted.

For example, a continuous touching operation for touching the same position for equal to or longer than a predetermined continuous length of time may be employed as the "successive operations".

Further, in the above-described embodiments, the MFP 1 may have a mail function for transmitting and receiving a mail via the internet. In this case, the present invention is applicable to a case where an interrupt request of the mail function occurs in accordance with a request from another device.

Further, in the above-described third and fourth embodiments, the current time obtained from the time circuit 25A is stored as the display updated time or the operational-button touched time, but the present invention is not limited to this configuration. For example, the MFP 1 may be configured to start a count-up of a timer upon the update of the display and store a time counted by the timer as the display updated time or the operational-button touched time.

It is noted that there has been explained the case where the interrupt request of the telephone function has been made as the interrupt request in the MFP 1 as the above-described embodiments, but the present invention is not limited to this configuration. For example, the present invention is also applicable to a case where the interrupt request is made from an internal device (e.g., a case where a request of different from the interrupt request of, e.g., the telephone function is made from the external device) such as a case where a dialog box is suddenly displayed on a display of a personal computer during an operation of the user using the personal computer or a case where a dialog box for replacement of an ink cartridge is suddenly displayed on the display panel 16a of the MFP 1 during setting of printing conditions in the printing function of the MFP 1.

What is claimed is:

1. An input apparatus comprising:
a display device configured to display an operational screen including at least one operational button image having a detecting area capable of detecting an input of an input object, the at least one operational button image each being associated with a corresponding one of processings which is executed when the detecting area of the at least one operational button image is touched or approached by the input object;
a processing executing section configured to, when the detecting area of the at least one operational button image is touched or approached by the input object, execute a processing assigned in advance to the touched or approached operational button image;
a display updating section configured to perform an update such that the operational screen displayed on the display device is changed from a first operational screen on which a first operational button image as the at least one operational button image is displayed to a second operational screen on which a second operational button image, as the at least one operational button image, which is different from the first button image is displayed;
a judging section configured to judge whether or not at least a part of the detecting area of the second operational button image, having been touched or approached by the input object, displayed on the second operational screen overlays at least a part of the detecting area of the first operational button image displayed on the first operational screen,
wherein, when the second image button is touched or approached by the input object and when the judging section has judged that the at least the part of the detecting area of the touched or approached second operational button image overlays the at least the part of the detecting area of the first operational button image, the processing executing section is configured to:
disable an execution of the processing assigned to the touched or approached second operational button image,
execute the processing assigned to the overlaid first operational button image in response to the touch or the approach of the input object on or to the second operational button image, while the touch or the approach of the input object on or to the overlaid first operational button image does not occur.

2. The input apparatus according to claim 1, wherein the display updating section includes a request-response updating section configured to update the operational screen on the display device in response to a request from an external device with which the input apparatus is enabled to communicate.

3. The input apparatus according to claim 1, wherein when the second operational button image is touched or approached by the input object, the processing executing section is configured to execute the processing assigned to the touched or approached second operational button image, when the judging section judges that the at least the part of the detecting area of the touched or approached second operational button image overlays the at least the part of the detecting area of the first operational button image.

4. The input apparatus according to claim 1, wherein the processing executing section is configured to disable, within a predetermined period of time from a time of the update, the execution of the processing corresponding to a touch or approach of the input object on or to the second operational button image.

5. The input apparatus according to claim 3, further comprising a predetermined-period judging section configured to, where the second operational button image has been touched or approached, judge whether or not the touch or approach of the input object on or to the second operational button image has been performed within a predetermined period of time from a time of the update,
wherein where the predetermined-period judging section has judged that the touch or approach of the input object on or to the second operational button image has been performed within the predetermined period from the time of the update, the processing executing section is configured to disable the execution of the processing corresponding to the touch or approach of the input object on or to the second operational button image, and
wherein where the predetermined-period judging section has judged that the touch or approach of the input object on or to the second operational button image has not been performed within the predetermined period from the time of the update, the processing executing section is configured to execute the processing corresponding to the touch or approach of the input object on or to the second operational button image.

6. The input apparatus according to claim 1, wherein where the first operational button image and the second operational button image have been successively touched or approached during a period from before the update to after the update, the processing executing section is configured to disable an execution of a processing corresponding to the touched or approached second operational button image.

7. The input apparatus according to claim 6, further comprising a succession judging section configured to judge whether or not the first operational button image and the second operational button image have been successively touched or approached during the period from before the update to after the update, wherein where the succession judging section has judged that the first operational button image and the second operational button image have been successively touched or approached and where the at least the part of the detecting area of the second operational button image touched or approached after the update and the at least the part of the detecting area of the first operational button image touched or approached before the update are overlaid on each other, the processing executing section is configured to disable the execution of a processing corresponding to a touch or approach of the input object on or to the second operational button image, during the touched or approached second operational button image being successively touched or approached after the update.

8. The input apparatus according to claim 7, wherein the succession judging section is configured to judge that the first operational button image and the second operational button image have been successively touched or approached, where a touch or approach has been performed within a predetermined successive judgment period from a time of a preceding touch or approach.

9. The input apparatus according to claim 1, wherein where the first operational screen has been updated by the display updating section in a state in which a touch or approach of the input object on or to the first operational button image is expected and where the second operational button image has been touched or approached, the processing executing section is configured to disable an execution of a processing corresponding to the touch or approach of the input object on or to the second operational button image.

10. The input apparatus according to claim 9, further comprising:

an expecting section configured to expect the approach of the input object to the first operational button image, wherein where the first operational screen has been updated by the display updating section in the state in which the approach of the input object to the first operational button image is expected by the expecting section and where the second operational button image has been touched, the processing executing section is configured to disable the execution of the processing corresponding to the touch of the input object on the second operational button image.

11. The input apparatus according to claim 1, wherein where an operational area including an area of the at least one operational button image and surrounding areas thereof has been touched or approached, it is detected that the input object has touched or approached the at least one operational button image included in the operational area.

12. The input apparatus according to claim 1, wherein where the display device displays a plurality of second operational button images as the second operational button image after the update, the display updating section is configured to display, after the update, one of the plurality of second operational button images corresponding to the processing whose execution is disabled when the second operational button image is touched or approached, in a manner different from a manner in which the other of the plurality of second operational button images corresponding to a processing whose execution is enabled when the second operational button image is touched or approached is displayed.

13. A non-transitory storage medium storing an input control program executed by an inputting apparatus, the input control program comprising:

displaying an operational screen including at least one operational button image having a detecting area capable of detecting an input of an input object, the at least one operational button image each being associated with a corresponding one of processings which is executed when the detecting area of the at least one operational button image is touched or approached by the input object;

when the touch or approach of the input object on or to a second operational button image, having been displayed before an update of a display device, which is different from a first operational button image having been displayed before the update of the display device has been detected after the update and when at least a part of the detecting area of the touched or approached second operational button image overlays at least a part of the detecting area of the first operational button image, disabling an execution of a processing assigned in advance to the touched or approached second operational button image; and when the touch or approach of the input object on or to the second operational button image has been detected after the update and when the at least the part of the detecting area of the touched or approached second operational button image overlays the at least the part of the detecting area of the first operational button image, executing a processing assign to the first operational button image in response to the touch or the approach of the input on or to the second operational button image, while the touch or the approach of the input object on or to the overlaid first operational button image does not occur.

* * * * *